(12) United States Patent
Talozi et al.

(10) Patent No.: US 8,271,948 B2
(45) Date of Patent: Sep. 18, 2012

(54) SUBSCRIBER IDENTITY MODULE (SIM) APPLICATION TOOLKIT TEST METHOD AND SYSTEM

(75) Inventors: Basil Talozi, Malmö (SE); Fredrik Topphem, Lund (SE); Nils Topphem, legal representative, Lund (SE); Gunilla Topphem, legal representative, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1759 days.

(21) Appl. No.: 11/276,531

(22) Filed: Mar. 3, 2006

(65) Prior Publication Data

US 2007/0207798 A1 Sep. 6, 2007

(51) Int. Cl.
G06F 9/44 (2006.01)
G06F 11/00 (2006.01)
(52) U.S. Cl. .................. 717/124; 455/558; 714/38.1
(58) Field of Classification Search .............. 379/433.09
See application file for complete search history.

(56) References Cited

U.S. PATENT DOCUMENTS

| | | | |
|---|---|---|---|
| 6,097,967 A | 8/2000 | Hubbe et al. | |
| 6,400,965 B1 * | 6/2002 | Phillips et al. | 455/558 |
| 6,547,150 B1 * | 4/2003 | Deo et al. | 235/492 |
| 6,676,022 B1 | 1/2004 | Guthery et al. | |
| 6,804,796 B2 * | 10/2004 | Gustavsson et al. | 714/38.1 |
| 7,165,191 B1 * | 1/2007 | Vakrat | 714/38.1 |
| 7,406,332 B1 * | 7/2008 | Gaillard et al. | 455/558 |
| 7,623,856 B2 * | 11/2009 | Azuma | 455/425 |
| 7,831,249 B2 * | 11/2010 | Lohlein et al. | 455/423 |
| 7,861,225 B2 * | 12/2010 | Lee | 717/124 |
| 2002/0137545 A1 | 9/2002 | Nachef | |
| 2004/0033814 A1 * | 2/2004 | Azuma | 455/558 |
| 2004/0076131 A1 | 4/2004 | Qu et al. | |
| 2005/0102639 A1 * | 5/2005 | Dove et al. | 715/864 |
| 2005/0119940 A1 | 6/2005 | Concilio et al. | |
| 2005/0176447 A1 | 8/2005 | Majewski et al. | |
| 2005/0176464 A1 | 8/2005 | Portasany Sanchez | |

(Continued)

FOREIGN PATENT DOCUMENTS

EP 1 331 559 A2 7/2003

(Continued)

OTHER PUBLICATIONS

3rd Generation Partnership Project, Universal Subscriber Identity Module Application Toolkit (USAT) Conformance Test Specification (Release 6), 3GPP TS 31.124 V6.1 [online], 2005 [retrieved Mar. 19, 2010], Retrived from Internet <http://www.3gpp.org/ftp/Specs/2005-09/Rel-6/31_series/31124-621.zip>, pp. 1, 44-59.*

(Continued)

*Primary Examiner* — Don Wong
*Assistant Examiner* — Todd Aguilera
(74) *Attorney, Agent, or Firm* — Roger S. Burleigh

(57) ABSTRACT

A method and system for testing subscriber identity module application toolkit (SAT) functionality. The method of the present invention includes loading a first computer program into a SIM card and loading a second computer program comprising a software tool for designing test, measurement, and control systems into a computer. The second computer program is executed to trigger an event which causes the first computer program to send a proactive command. The proactive command data is then sent to the SIM card through a terminal response command.

18 Claims, 4 Drawing Sheets

U.S. PATENT DOCUMENTS

| | | | |
|---|---|---|---|
| 2005/0193098 A1 | 9/2005 | Khandpur et al. | |
| 2006/0117225 A1* | 6/2006 | Hsin et al. | 714/38 |
| 2006/0174162 A1* | 8/2006 | Varadarajan et al. | 714/38 |
| 2006/0218533 A1* | 9/2006 | Koduru et al. | 717/124 |
| 2007/0006154 A1* | 1/2007 | Yang et al. | 717/124 |
| 2007/0288896 A1* | 12/2007 | Lee | 717/124 |
| 2009/0197645 A1* | 8/2009 | Specchio et al. | 455/558 |

FOREIGN PATENT DOCUMENTS

| | | |
|---|---|---|
| EP | 1 224 823 B1 | 3/2005 |
| EP | 1 528 827 A2 | 5/2005 |
| EP | 1 677 197 A | 7/2006 |
| WO | WO 03/061247 A2 | 7/2003 |
| WO | WO 2004/068819 A1 | 8/2004 |
| WO | WO 2005/013580 A1 | 2/2005 |

OTHER PUBLICATIONS

Sclumberger, Cyberflex Access Developer's Series Programmer's Guide [online], 1999 [retrieved Mar. 19, 2010], Retrieved from Internet <http://www.it.iitb.ac.in/~satish/phd/smartcard/cyberflex/Cyberflex%99%20Access%20Developers%20Series%20Programmer%92s%20Guide.pdf>, pp. 1-328.*

$3^{rd}$ Generation Partnership Project,Technical Specification Group Terminals Subscriber Identity Module Application Programming Interface (SIM API) for Java Card Stage 2 (Release 1999), 3GPP TS 03.19 V8.5.0 [online], 2002 [Retrieved Aug. 24, 2010], Retrived from Internet <http://ftp.3gpp.org/specs/html-info/0319.htm>, pp. 1-23.*

$3^{rd}$ Generation Partnership Project, Specification of the SIM Application Toolkit for the Subscriber Identity Module—Mobile Equipment (SIM-ME) Interface (Release 1999), 3GPP TS 11.14 V.8.17.0 [online], 2004 [Retrieved Aug. 24, 2010], Retrieved from Internet <http:////www.3gpp.org/ftp/Specs/html-info/1114.htm>, pp. 1-139.*

$3^{rd}$ Generation Partnership Project, Technical Specification Group Terminals; Test Specification for SIM API for Java Card, TS 11.13 v8.3.0 [online], 2004 [retrieved Jun. 11, 2012], Retrieved from Internet: <http://www.3gpp.org/ftp/Specs/archive/11_series/11.13/1113-830.zip>, pp. 1-425.*

Gemplus; "GemXplore Developer, Getting Started;" Internet Citation, Apr. 4, 2004 (http://www.gemplus.com/products/gemxplore_developer/support/dowload/GemXploreDeveloperGettingStarted.pdf, Chapters 1, 5 and 6.

Java card applet developer's guide (Note: Link is no longer available) http://www.informatik.uniaugsburg.de/lehrstuehle/info1/lehre/ss04/javacard/doc/JCADG.pdf.

Java world http://www.javaworld.com/javaworld/jw-07-1999/jw-07-javacard.html.

Java Card Questions and Answers with Zhiqun Chen http://developers.sun.com/techtopics/mobilitv/javacard/articles/interview/.

Boost Value Added Services With SIM Application Toolkit http://www.gemplus.com/dwnld/1806¯stkwhiteppmay2001.pdf.

Gemplus http://www.gemplus.com.

*ISO—International Organization for Standardization* www.iso.org/.

An Introduction to Java Card Technology—Part 1 http://developers.sun.com/techtopics/mobility/javacard/articles/javacard1.

An Introduction to Java Card Technology—Part 2, *The Java Card* developers.sun.com/techtopics/ mobility/javacard/articles/javacard2.

3GPP TS 31.111 SIM Application Toolkit www.3gpp.org.

Aspects Software http://www.aspects-sw.com.

GEMPLUS: "GemXplore Developer, Getting Started" Internet Citation, [Online] Apr. 4, 2004, XP002332666 Retrieved from the Internet: URL:http://www.gemplus.com/products/gemxplore¯developer/support/download/GemXploreDeveloperGettingStarted.pdf> [retrieved on Jun. 20, 2005] Chapters 1, 5, 6.

Philipps J et al: "Model—based test case generation for smart cards" Electronic Notes in Thoeretical Computer Science. XX, XX vol. 80, Jan. 1, 2003. pp. 1-15, XP0023333127 the whole document.

* cited by examiner

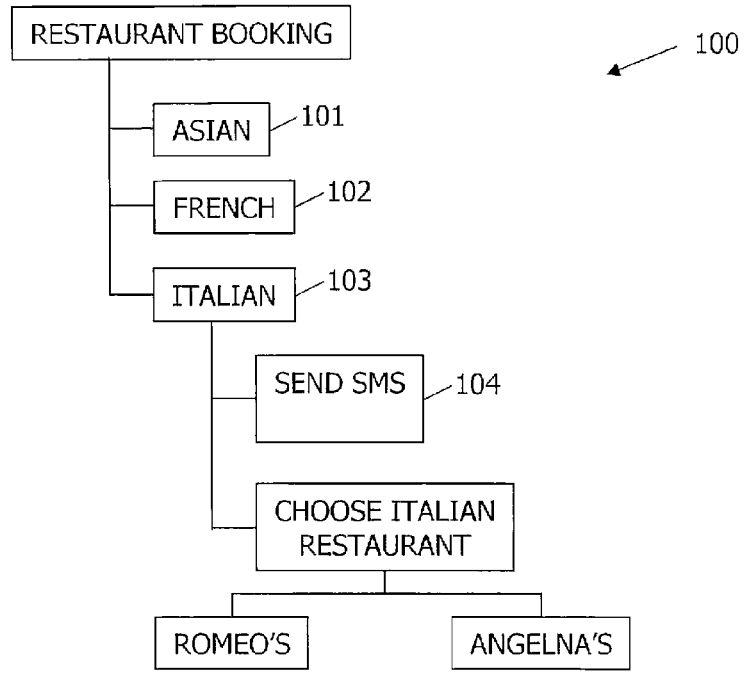
Fig. 1 *(Prior Art)*
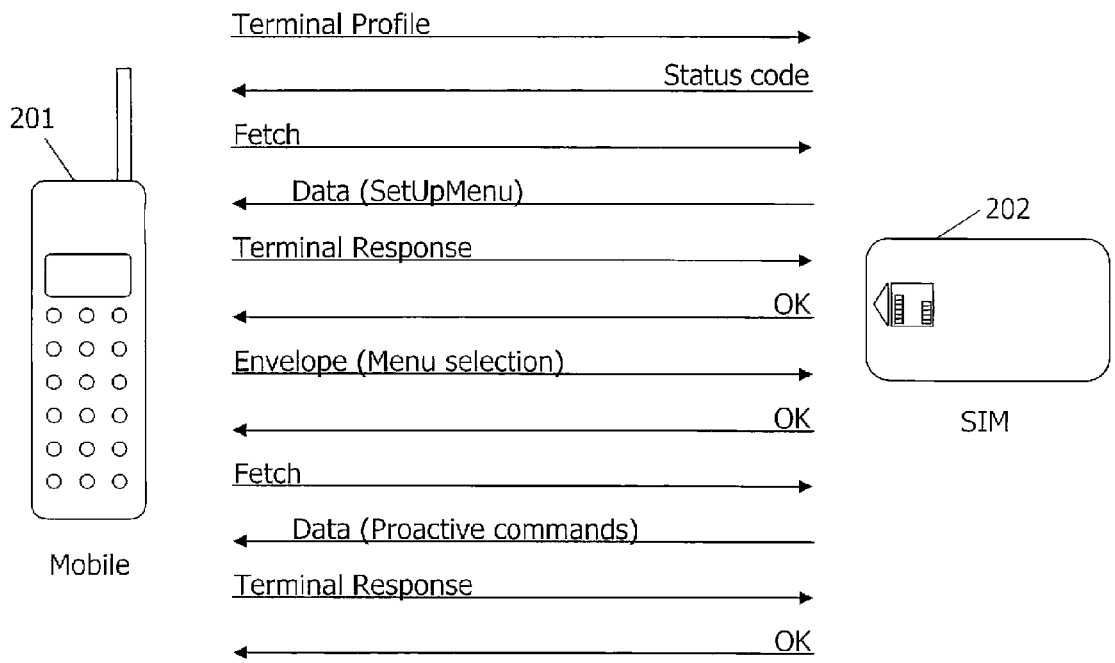
Fig. 2 *(Prior Art)*

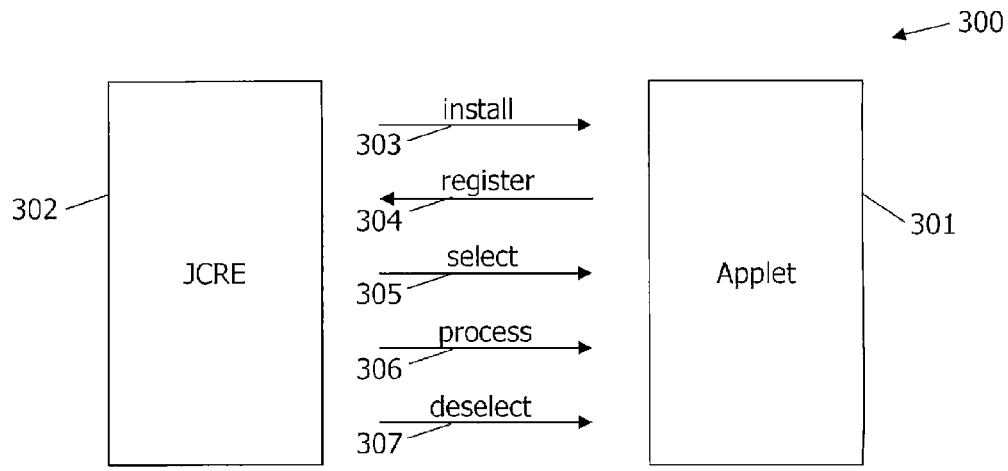
Fig. 3 *(Prior Art)*
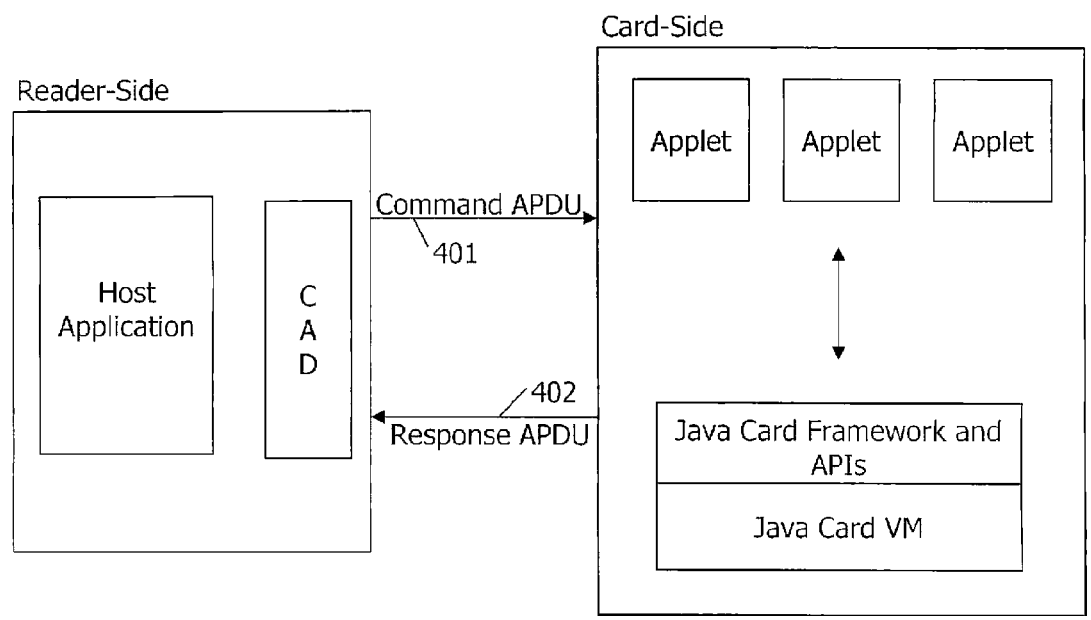
Fig. 4 *(Prior Art)*

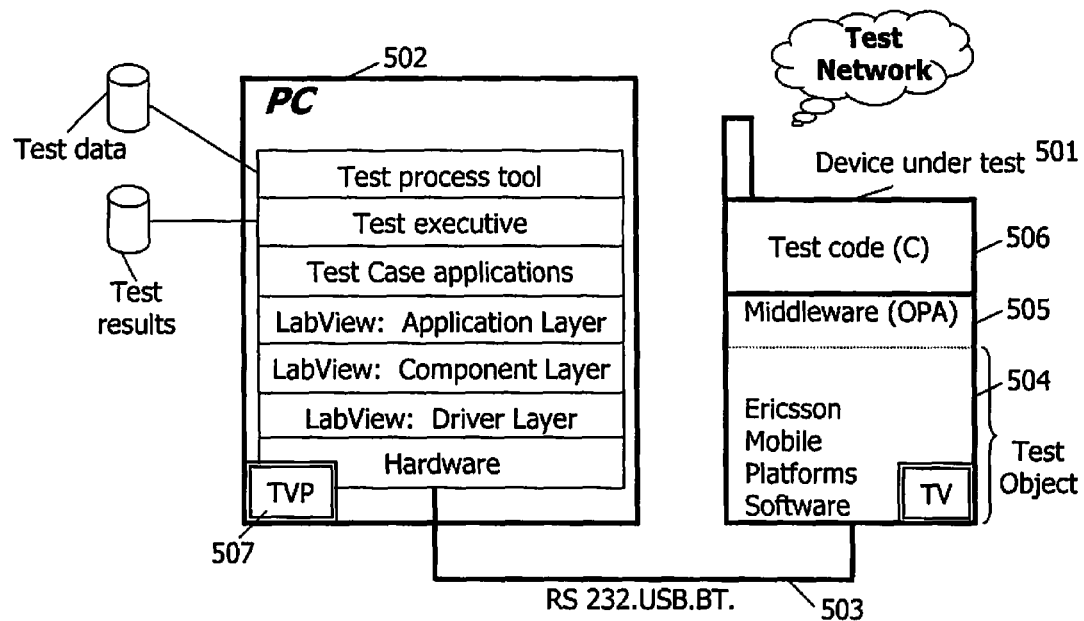
Fig. 5 *(Prior Art)*
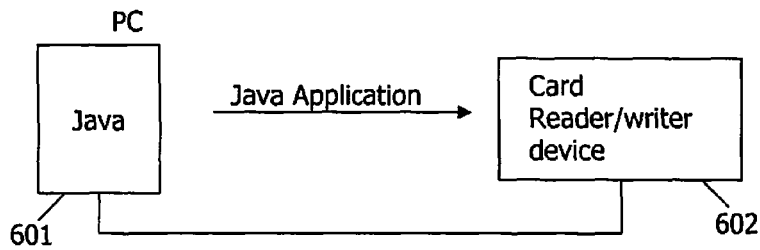
Fig. 6
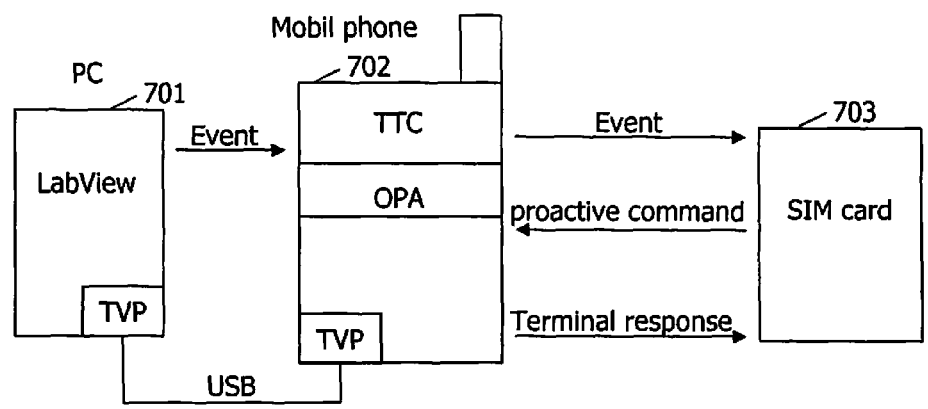
Fig. 7

SUBSCRIBER IDENTITY MODULE (SIM) APPLICATION TOOLKIT TEST METHOD AND SYSTEM

TECHNICAL FIELD

The general technical field to which the present invention relates is the testing of Subscriber Identity Module (SIM) application toolkits on Subscriber Identity Module (SIM) cards.

BACKGROUND

The following abbreviations shall have the following meanings when used in this application:
CAD, Card Acceptance Device;
DUT, Device Under Test (mobile terminal);
GSM, Global System for Mobile Communications;
IC, Integrated Circuit;
IEC, International Electro technical Commission;
ISO, International Organization for Standardization;
OPA, Open Platform Application Programming Interface;
SwBP, Software Backplane;
TC, Test Case;
TTC, Target Test Code;
TVA, Test and Verification Assistant;

A SIM (Subscriber Identity Module) card, also sometimes referred to as a smart card, is an electronic circuit typically located on a small card and which can be installed in a mobile terminal, including a mobile handset, which is used to subscribe the mobile terminal of a user to a mobile network. The SIM card contains relevant information that enables access onto an operator's network.

A SAT (SIM Application Toolkit) is a set of commands which define how the SIM card should interact with the outside world and extends the communication protocol between the SIM card and the mobile terminal. By using a SAT, the SIM card has a proactive role in the handset. This means the SIM card is adapted to initiate commands independently of the mobile terminal and the network. More specifically, a SAT provides a mechanism by which customized applications created on the SIM card can interact with the functionality of the mobile terminal, For example, a SAT can enable customers to check their bank accounts; pay bills or locate a restaurant by using a SAT enabled mobile terminal with an appropriate SAT specific SIM card.

In second generation (2G) networks, SAT was defined in the GSM 11.14 standard. From release 4 onwards, GSM 11.14 is replaced by 3GPP 31.111 which also includes specifications of USIM card Application Toolkit (USAT) for 3G networks.

A SAT proactive command is a command that resides on a SIM card. It is proactive because the SIM card serves the requests needed by the mobile terminal. That is, the card acts as the server and the mobile terminal as the client. The main difference between proactive commands and other commands is that the latter commands are issued by the mobile terminal and not by the SIM card. SAT can be viewed as a method of permitting the network operator to offer customized services, independently of the mobile terminals and the mobile terminal manufacturers. Some services that the customers can have with their mobile terminal using the SAT include phone banking, information services (e.g. stock price, weather, news, etc.), mobile data and fax, WAP, and mobile chat room.

With SAT, the SIM card can be programmed with an application that can be accessed on the mobile terminal. Applications can be entirely defined by the network operator and additional menus can be installed on the mobile terminal using the SIM card. This makes it possible to issue GSM/UMTS (Universal Mobile Telecommunications System) services together with network operator specific menus such as mobile terminal banking.

There are various reasons that the value added services are deployed on the SIM card and not on the mobile terminal. The most important reason is that the SIM card belongs to the network operator and not the mobile terminal owner or customer. The card is defined and customized by the network operator, making it the only link between network services and the customer. With remote management tools, the SIM card can be controlled remotely at any time giving the network operator total control of the applications, their download and their removal.

SAT features can be classified into different categories such as: interaction with the user; communication services; data download, user activity management; and mobile terminal/SIM card interaction management.

Interaction with the User

The SIM card itself does not interact directly with the user. The SAT acts as the interface between the mobile terminal and the SIM card, accessing information on the mobile terminal to give to the user. A set of proactive commands is available for this purpose.

The three main items used by the SAT application are: display screen, keypad, and audio interface.

The SIM card is adapted to engage in several interactions. It can request that the mobile terminal display a list of options in a menu. The user makes a selection, which the mobile terminal sends to the SIM card. In addition, the SIM card can request that the mobile terminal display text or icons in order to improve the level of interaction with the user or play a pre-defined tone in its memory to signal an event to the user. Other interaction includes entering a single character or a string such as a pin code or short message.

Communication Services

Communication channels can be established between the SIM card and the network through the mobile terminal interface. The SIM card can request the mobile terminal to set up a call to a given telephone number or send different data strings to the network e.g. SMS (Short Message Service), SS (Supplementary Services) and DTMF (Dual Tone Modular Frequency).

Data Download

Data sent from the network or other device to the mobile terminal can be received by the SIM card. The set of proactive commands allows the SIM card to establish a data channel with the mobile terminal, and then onto a remote server in the network. The mobile terminal then allows the SIM card and the server to exchange data on this channel.

User Activity Management

The SIM card is able to keep track of the user's activities in order to carry out various actions. The SIM card can control the dialed number; the sent data messages, and can store different events in the mobile terminal such as outgoing calls, incoming messages and idle mode. In order to define the location of the user, the SIM card is adapted to request the mobile terminal for information which it sends to a server, which, in turn, calculates the cell-based location of the mobile terminal.

Mobile Terminal/SIM Card Interaction Management

Several commands which are grouped together are used for the management of mobile terminal-SIM card communication. The mobile terminal can perform random checks to determine if the SIM card is still present through different commands, including refresh files held on the SIM card, manage the mobile terminal's timer (e.g., for meetings programmed into the diary or to request more time to process an action) and specify which language the application will use.

Description of Proactive Commands

The proactive commands can be divided into six parts: control of the man-machine interface; communication control services; data download; user activity control; accessory management: dual slot commands; and mobile terminal/SIM card interaction management.

Control of the Man-Machine Interface

Set Up Menu: The SIM card sends a new menu item list to the mobile terminal during initialization or removes the old menu. The mobile terminal includes the new menu items in its own menu.

Menu Selection: The Menu Selection mechanism is used to transfer the SIM card application menu item, selected by the user, to the SIM card. For example, if the user selects the "travel" menu on the mobile terminal, the "travel" application will be launched in the SIM card.

Select Item: The SIM card sends a sub-menu with a list of items to the mobile terminal. The user makes his/her selection and the SIM card sends the command to the server. This means that if the mobile terminal displays a list of services available, the SIM card will activate the service selected by the user.

Display Text and/or icons: The SIM card instructs the mobile terminal to display text or various icons that have been used to exchange information with the user, such as, for example, "On-line Retailer". The SIM card can also request the mobile terminal to display icons residing on the SIM card.

Get Inkey: This command requests the user to enter a single character. For example, the text "place order Y/N" would be displayed on the mobile terminal and the character entered by the user is sent back to the SIM card.

Get Input: The SIM card sends this command to request the user to enter a character string. For example, the SIM card may display "enter book reference" and the user would enter a product reference of several characters.

Play Tone: This command requests the mobile terminal to play an audio tone. A list of tones to play for different events, for example, error PIN code, receiving call, etc., is pre-defined in the mobile terminal.

Setup Idle Mode Text: This command is used to display a certain message when the mobile terminal is in idle mode, for example, no user activity, no incoming calls, and no outgoing calls. This command could be used, for example, to display the operator's name on the mobile terminal screen while the user is roaming.

Soft keys support: This can be implemented through the SET UP MENU and the SELECT ITEM commands. If implemented by the mobile terminal, this soft key support can link application items to specific keypads on the mobile terminal, which eases the user's item selection process.

Communication Control Services

Launch browser: The SIM card can, if necessary, request the mobile terminal to launch a browser to reach remote content sites. The command can contain relevant information about the browser.

Set Up Call: The SIM card sends this command to request an automatic call to a given number. Three types are defined: set up a call, but only if not currently busy on another call, set up a call, putting all other calls (if any) on hold; and set up a call, disconnecting all other calls (if any) first.

Send SMS: The SIM card instructs the mobile terminal to send a short message (SMS). This can be a request for information such as a weather report, a traffic report or currency exchange rates.

Send SS: The SIM card sends a SS Control string to the mobile terminal in order to request an SS from the network. This is used, for example, to request call forwarding or call barring.

Send USSD (Unstructured Supplementary Service Data): A USSD is a data message that travels through the same channel as SS. The sender knows immediately when and if the message has been received. For example, a Send USSD command would be used to request a service provider for information. This channel is faster than SMS, as it does not have to travel through a SMS center or another server.

Send DTMF: The SIM card sends a Dual Tone Modular Frequency string to the network. This is particularly useful when accessing interactive voice response based services. Instead of keying in the user's 10-digit authentication number to access a service, the user presses a single button that sends the DTMF string off to the server.

Run AT Command: This feature enables a mobile terminal user to leverage the AT commands that are usually used between a mobile terminal and an auxiliary terminal, such as a PC, PDA, etc., and use them to the SIM card's advantage. AT commands are generally used by the auxiliary terminal to query the mobile terminal for information about radio frequency data, broadcast speed, etc. With Run AT Command, the SIM card can make requests to the mobile terminal using AT commands.

Data Download

CB (Cell Broadcast) Download: If the service "data download via SMS-CB" is allocated and activated, a SMS-CB can be transferred to the SIM card. A CB envelope broadcasts a message to all of the mobiles in a particular region. The mobile terminal can forward the CB page to the SIM card. A use of the SAT in this situation could be to use the SIM card as a filter for CB messages. A user having previously subscribed to specific information messages could, through the SIM card only, obtain on the mobile terminal what has been subscribed for, for example, a local weather forecast.

SMS PP Download: This feature will allow data to be downloaded through the Short Message channel on a card-by-card basis (Point to Point—PP). This data can read or communicated to an application in the SIM card.

Open channel: This request from the SIM card allows the SAT to have access to a data channel, other than SMS, through a link established by the mobile terminal according to the parameters given by the SIM card. The data channel can be either CSD (Circuit Switched Data) or GPRS (General Packet Radio Service).

Close channel: The SIM card is able to close the link previously established.

Receive data: This command requests the mobile terminal to return data from a dedicated data channel. Upon receiving this command, the mobile terminal returns to the SIM card the data available in a specific buffer corresponding to the selected channel.

Send data: This command requests the mobile terminal to send data through a previously set up data channel corresponding to a dedicated channel identifier. The SIM card can request the mobile terminal to send the data immediately or to store it until a more appropriate time.

Get channel status: The SIM card can request the mobile terminal to return information about the different data channels. It can be used to research existing data channels and their availability.

User Activity Control

Call control: When this mode is activated, each time the user dials a number, the mobile terminal sends a Call Control Envelope to the SIM card (which controls any outgoing calls).

MO (Mobile Originated) Short Message Control: Before sending any SMS, the mobile terminal requests the SIM card for authorization. The SIM card returns an answer, which can either be authorization, refusal or authorization with changes.

Event Download: This command is sent from the mobile terminal to the SIM card to indicate that an event has occurred. Possible events to be downloaded to the SIM card are: Mobile Terminated call (incoming call); Call Connected; Call Disconnected; User Activity (the user has been pressing buttons on the mobile terminal); Idle Screen Available (there is a blank screen). This command is particularly useful because it gives the SIM card the opportunity to react to events other than simple user actions.

Set Up Event List: The SIM card will give the mobile terminal the list of events it wants to know about if they happen. For example, the SIM card could request to be informed about "Idle Screen Available" so as to insert short advertisements while the screen is blank.

Provide Local Information: The SIM card can request information about the current location of the mobile, such as country code, mobile network code, location area code, cell identity value, language, network measurement result. This is useful if the user is looking for a number in their area as the SIM card includes local information in its request message to the server. In addition, an application may require this information to display certain messages. For example, a fast food chain could set up an application to promote its restaurants by requesting nearby base stations to send a promotional message to users as and when they are close.

Accessory Management: Dual Slot Commands

Power On Card and Power Off Card: This command will apply power on the SIM card that is in the second slot. The Power Off Card command will turn the power off.

Get Reader Status: The SIM card will request the reader for the status of the SIM card in the second slot.

Perform Card APDU (Application Protocol Data Unit): The SIM card will send a command to the second SIM card. An APDU refers to the ISO/IEC 7816-4 standard.

Mobile Terminal/SIM Card Interaction Management

Language notification: The SIM card can use this command to notify the mobile terminal about the language currently used for any text string within proactive commands or command responses. For instance, this command could be used to avoid a mix of languages in screen displays combining mobile terminal and SAT originating text strings.

Poll Interval/Polling off: Periodically, the mobile terminal sends a status command to the SIM card to check whether the SIM card is present. The SIM card can send a poll interval command to request a certain amount of time between status commands. The polling off command cancels any previous poll interval commands.

Timer Management/Timer Expiration: This feature allows the SIM card to manage the mobile terminal's timer. It could be used in a personal organizer application with a beep set as a reminder for important meetings or appointments. The timer expiration feature allows the SIM card to request the time remaining before specific events, such as a display message that reads "5 minutes before meeting".

More Time: More Time allows the SAT more time for processing its request, if the processing takes long enough to affect normal GSM operation, and clock stop prevents processing to take place in the background. For example, if an application is downloaded in more than one SMS and a call is received, the "more time" command will be activated.

Refresh: The purpose of this command is to notify the mobile terminal of any changes in SIM card files during an application as the SIM card must inform the mobile terminal of any changes that occur. For example, in the event of the download of a set of numbers into the Fixed Dialing Numbers (FDN) file in the SIM card, the SIM card would request the mobile terminal to update its own image of the file.

Structure of Proactive Command

Proactive commands are based on a series of data as hexadecimal values according to SAT 3GPP specification. To simplify the understanding of a proactive command structure, an example for the command "DISPLAY TEXT" is given in Table 1 below. The proactive command is sent from the SIM card to the mobile terminal.

| Byte number | Value (Hex) | Description |
| --- | --- | --- |
| 1 | D0 | Proactive command tag |
| 2 | 10 | Length (the length of the whole command) |
| 3 | 81 | Command details tag |
| 4 | 03 | Length (length of command details data) |
| 5 | 01 | Command number (command details data) |
| 6-7 | 21, 00 | Display text (normal priority, clear message after a delay) (command details data) |
| 8 | 82 | Device identities tag |
| 9 | 02 | Length (length of device identities data) |
| 10 | 81 | Source: SIM card (device identities data) |
| 11 | 02 | Destination: Display (device identities data) |
| 12 | 8D | Text string tag |
| 13 | 04 | Length (length of text string data) |
| 14 | 04 | Data coding scheme ('04' = 8-bit default SMS) (text string data) |
| 15-17 | 53, 41, 54 | text string ("SAT") |

Structure of Terminal Response

The terminal response is send from the mobile terminal to the SIM card. The terminal response indicates if the proactive command is correctly executed. The structure of the terminal response is uniquely defined for each proactive command. Table 2, below is the terminal response for the proactive command "DISPLAY TEXT".

| Byte number | Value (Hex) | Description |
| --- | --- | --- |
| 1 | 81 | Command details tag |
| 2 | 03 | Length (length of command details) |
| 3 | 01 | Command number (command details data) |
| 4 | 21 | Type of command (command details data) |
| 5 | 00 | Command Qualifier (command details data) |
| 6 | 02 | Device identities tag |
| 7 | 02 | Length (length of device identities) |
| 8 | 82 | Source device identity (device identity data) |
| 9 | 81 | Destination device identity (device identity data) |
| 10 | 83 | Result tag |
| 11 | 01 | Length (length of Result) |
| 12 | 00 | General result (Result data, command performed successfully) |

Application of SAT Service

Referring now to FIG. 1, a restaurant booking example 100 illustrates how a SAT application can easily provide useful services to a user. A user who has a "local restaurant booking" service in his/her subscription desires to book an Italian restaurant in the vicinity. When the mobile terminal is turned on, the SIM card verifies if the mobile terminal is SAT compatible. The SIM card then sends a Set Up Menu proactive command to the mobile terminal, with the Services menu displayed on the mobile terminal's screen. Once the user has selected a "Restaurant Booking" application, the mobile terminal returns a Menu Selection envelope to the SIM card.

As seen in FIG. 1, the user will be able to choose between three different restaurant types, 101, 102, 103. The SIM card sends a command to the Display Menu Item and waits for the user to return their user selection. When the user chooses "Italian" 103, the SIM card launches a Select Item List proactive command to record the Item chosen. The SIM card then packages a SMS 104, which contains the item chosen (i.e. "Italian" 103) and the cell where the user is located. The SMS 104 is then sent to a dedicated Short Message Service Center for processing. The network computes the names and telephone numbers of local restaurants and returns them to the SIM card via SMS.

FIG. 2 illustrates the communication procedure 200 for the mobile terminal 201 and a SIM card 202. As seen therein, once mobile terminal 201 is turned on, initialization procedure begins between the SIM card 202 and the mobile terminal 201. Mobile terminal 201 initiates the profile procedure by sending a terminal profile, which informs SIM card 202 whether it supports SAT functionality or not. If mobile terminal 201 supports SAT, SIM card 202 sends a status code indicating that the proactive command session can begin. A fetch command is sent from mobile terminal 201 to get the proactive command from SIM card 202. When mobile terminal 201 receives and executes the proactive command, it sends a terminal response back to SIM card 202 indicating the outcome of the proactive command. When SIM card 202 receives the terminal response, an indication code is sent to mobile terminal 201 notifying that the SIM card is ready to send the next proactive command.

Java card technology enables SIM cards with very limited memory to run small applications, called applets that employ Java technology. The technology enables developers to build, test, and deploy applications and services rapidly and securely. Java Card technology is compatible with existing SIM card standards such as SIM cards that are used in mobile terminals. Java Card technology is an open application standard which allows developers to produce applications that can run on cards from different manufacturers. Applications from different developers can run on the same SIM card. This has opened up SIM card development to independent application providers.

Java Card technology comprises a set of specifications for an application-programming interface (API). The API specification identifies the core Java Card class libraries comprising a virtual machine. The virtual machine specification describes the characteristics of the virtual machine for handling Java Card applications. The Java Card Runtime Environment (JCRE) specification details runtime behavior, such as how memory is managed or how security is enforced, and Applet development The typical process when creating a Java card application is: write Java source code; compile the code into a class file; convert the class file into a Converted Applet (CAP) file; and install the CAP file. To write Java source code, the developer must be aware of how to design an applet. The design is essential to maintain a functional program. The four steps in the applet-design phase are: specify the functions of the applet; request and assign AID (Application ID) to both the applet and the package containing the applet class; design the class structure of the applet programs; and define the interface between the applet and the terminal application. The applet can be downloaded on a SIM card using an external card acceptance device, and then tested.

An Application ID (AID) uniquely identifies each applet on a card. An AID, as defined in ISO 7816-5, is a sequence of bytes between 5 and 16 bytes in length. All applets must extend from the javacard.framework.Applet class. This class is the super class for all applets residing on a Java card. It defines the common methods an applet must support in order to interact with the JCRE during its lifetime.

Referring now to FIG. 3, applet methods used to communicate between JCRE and a Java applet is provided. As seen in FIG. 3, the applet life cycle 300 begins when the applet 301 is downloaded to the SIM card and the JCRE 302 runs the applet's static Applet.install( )method in step 303, and the applet registers itself with the JCRE by running Applet.register( ) in step 304. Once the applet is installed and registered, it is in the unselected state, available for selection and APDU processing. While in the unselected state, the applet is inactive. An applet gets selected for APDU processing when the host application requests the JCRE to select a specific applet in the card (by instructing the card reader to send a SELECT APDU or MANAGE CHANNEL APDU). To notify the applet that a host application has selected it, the JCRE calls its select( )method in step 305; the applet typically performs appropriate initialization in preparation for APDU processing. Once selection is done in step 305, the JCRE passes incoming APDU commands to the applet for processing by invoking its process( )method in step 306. The JCRE catches any exceptions the applet fails to catch. Applet deselection occurs in step 307 when the host application tells the JCRE to select another applet. The JCRE notifies the active applet that it has been deselected by calling its deselect( )method in step 307, which typically performs any clean-up logic and returns the applet to the inactive, unselected state.

FIG. 4 illustrates communication between reader-side and card-side. As seen therein, the communication between the reader-side and the SIM card is done using Application Protocol Data Unit (APDU), a logical data packet that is exchanged between the Card Acceptance Device (CAD) and the Java Card Framework in step 401. The Java Card Framework receives and forwards to the appropriate applet any incoming command APDU sent by the CAD. The applet processes the command APDU, and returns a response APDU in step 402. The APDUs conform to the international standards ISO/IEC 7816-3 and 7816-4. The host application runs on a terminal such as a PC or a mobile terminal and handles communication between the user and the Java Card applet.

FIG. 5 illustrates a test environment used at a typical system verification location. All tests are run on a reference mobile terminal DUT. A tester interacts with the mobile terminal DUT 501 through a PC 502. The communication medium between PC 502 and mobile terminal DUT 501 can be a cable (RS 232), USB cable or a Bluetooth medium 503. The test environment comprises the elements necessary to test the mobile terminal DUT: mobile platform software 504 comprises a black box containing the source code for mobile terminal functionality, for example, source code for SIM card, SAT, phonebook, file system, etc.; middleware (OPA) 505 which is the interface used to communicate with the software platform; and target test code 506 which is the test code developed to implement a test case. Test code 506 is used to simulate functionality in the mobile platform software via the OPA interface. For example, to test proactive command functionality, test code is written in C that calls the proactive command interface on OPA that in turn calls the SAT functionality in the SwBP. The TVP software module 507 is developed by the system verification department to insure test automation between PC and the DUT. TVP software module 507 resides on both PC 502 and DUT 501. On the PC Side, a software tool for designing test, measurement, and control systems, such as LabView, is used as the interface between the tester and the DUT.

Testing of SAT functionality in mobile terminals is complicated due to the SIM card having a proactive role as hereinabove described. Because the SIM card sends proactive commands independently of the mobile terminal, the execution of the proactive commands are difficult to control. The conventional technology available to create proactive commands and control their execution at the same time permits the testing of SAT functionality in the mobile terminal by comparing the proactive commands. If the sent proactive commands have been the same as the reference file, then the test is proper.

However, there are several disadvantages in testing SAT functionality using the conventional method, including the high cost and lack of efficiency as all of the proactive commands of the conventional method must be hard coded using a JAVA file; the comparison of the terminal response sent by the mobile terminal with the response is done manually, increasing the time required to perform the test; and in updating test files when additional test cases are required. What is desired is an improved method and system for testing SAT functionality for a mobile terminal, specifically, a method and system having improved flexibility and that can be automated.

SUMMARY

The present invention is a method and system for testing subscriber identity module application toolkit (SAT) functionality. The method of the present invention includes the steps of loading a first computer program into a SIM card and loading a second computer program comprising a software tool for designing test, measurement, and control systems into a computer, such as a PC. When the second computer program is executed, it triggers an event which causes the first computer program to send a proactive command. The proactive command data is then sent to the SIM card through a terminal response command.

BRIEF DESCRIPTION OF THE DRAWINGS

FIG. 1 is a flow chart illustrating the use of the described subject matter to book a restaurant reservation;

FIG. 2 illustrates the communication procedure between the mobile terminal and the SIM card;

FIG. 3 illustrates the applet methods used to communicate between JCRE and a Java applet;

FIG. 4 illustrates the test environment used at a typical system verification department;

FIG. 5 illustrates a connection of PC and SIM card reader/writer device;

FIG. 6 illustrates communication among a PC, mobile terminal and SIM card according to the described subject matter;

FIG. 7 is a flow chart illustrating the method for downloading data to the SIM card through the terminal response.

DETAILED DESCRIPTION

Figure 8:
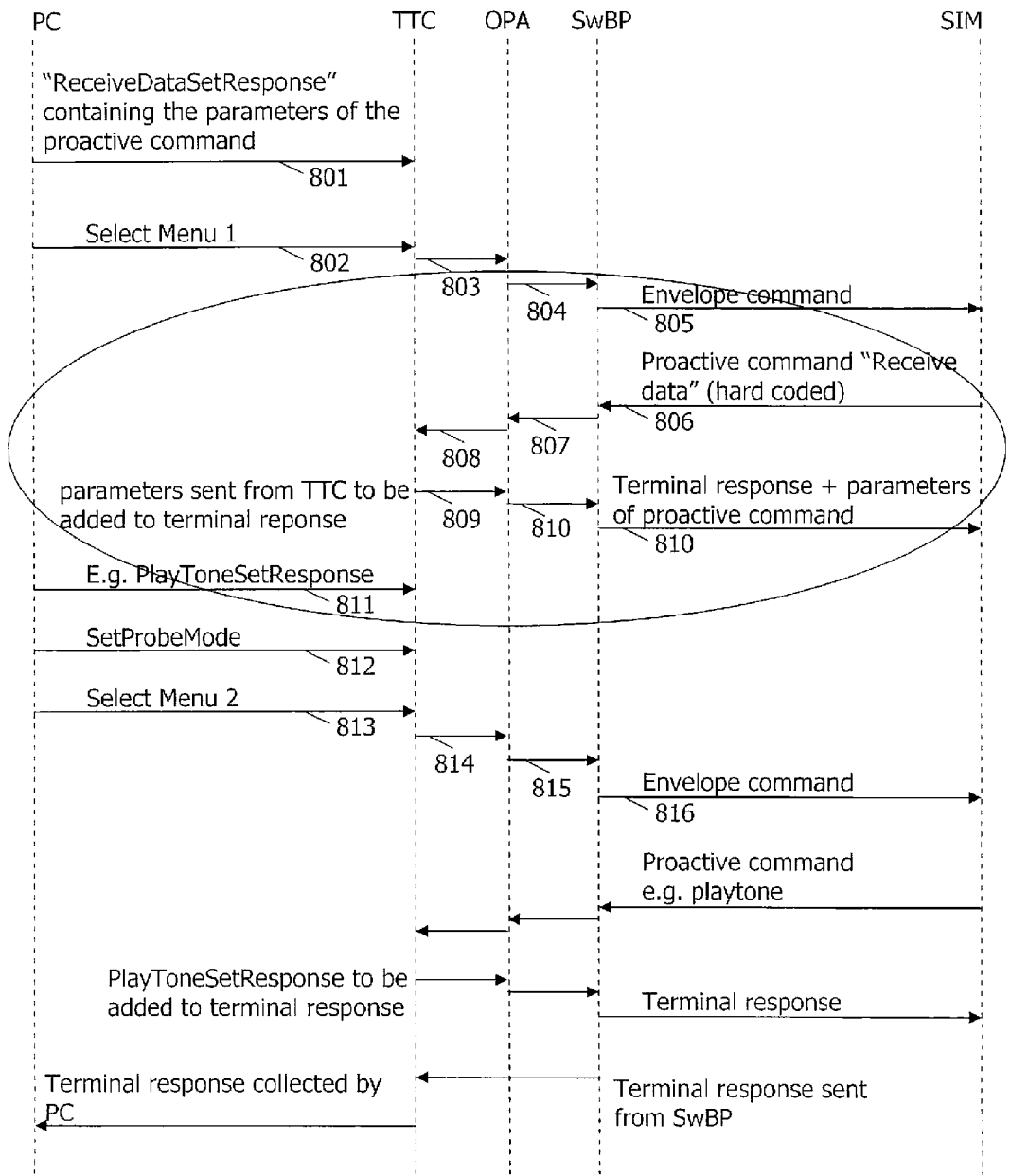
FIG. 8 is a flow chart illustrating the sequence of communication among a PC, mobile terminal and a SIM card

The described subject matter combines two software programs that work together to achieve the same effect as conventional test methods and systems. In a first embodiment of the present invention, the first program is written in Java and is located on a SIM card while the second program is created in a program such as LabView and runs on a PC. The embodiments described are adapted to create and send proactive commands, and it also compares the outcome of the proactive command automatically, which simplifies the test procedure. More specifically, the described subject matter is implemented using a Java card applet loaded on a SIM card and LabView test cases located on a PC. The Java card applet can be loaded on almost any SIM card since the size of the applet is typically about 4 KB. Using the described embodiments, the tester can send all proactive commands defined in 3GPP for testing SAT. New proactive commands can easily be implemented since they are basically the same as the previous ones, the only different lies on the data they contain.

To implement this, there is a need to trigger the SAT application on the SIM card through a script which resides on the PC. In the described embodiment this is done by writing this script in LabView, but it should be appreciated that this script could be written with other software tools, including but not limited to Visual Basic, C, C++ and Matlab/Simulink. The command is needed from the PC to communicate with SIM card to let the SAT application send a proactive command to the mobile platform and hence initiate the process.

Referring to FIG. 6, Java applications for producing SAT proactive commands are first written in a Java program 601 and then downloaded to the SIM card using a card reader/writer device 602. The SIM card is then inserted in a mobile terminal before performing the test.

As seen in FIG. 7, the PC 701 communicates with the mobile terminal 702 using the LabView script. All communications with the mobile terminal 702 are performed via TTC. When the proactive commands are executed, the LabView script captures the terminal response that is sent to SIM card 703. The terminal response sent by the mobile terminal is compared with the correct terminal response defined in the 3GPP specification.

To test the SAT functionality in the mobile platform, test cases must be created. A test case is a test scenario that performs a specific task. One task, for example, is to test one SAT proactive command.

A test case involves more activities than a proactive command. A test case has the following structure: pre condition, execution and post condition. The purpose of pre condition is to prepare the test case, for example, initialization of the mobile terminal and determination of the parameters needed. The purpose of execution is to test the main task, for example, the SAT proactive commands. The purpose of post condition is to cleanup the test case, for example, remove connections for SAT activities needed to test SAT.

The following activities are required to design and execute a test case: plan the test case, design the test case, implement the test case, validate the test case, execute the test case and analyze the results. The input for planning an SAT test case is the 3GPP specification where all proactive commands are described. It is necessary to understand the structure of all the proactive commands before implementing the test case. The test case is then designed. A scenario is written describing what the test will do. Implementation of the test case is the primary activity after the specification of a test case. A first test is run on the DUT to validate the test case implementation. This means that it has been confirmed that the LabView code, Java applet and test case parameters are all valid. For validation, any discrepancies on the code or parameters must be corrected and updated. Execution of the test case is undertaken by running the LabView script. The script executes the test case and the test case procedure is performed automatically. The result from the test case is the terminal response. The terminal response is compared to a reference value, and the result is displayed in a LabView front panel. The foregoing sequences are repeated to test all available proactive commands.

The present invention can be used in one of two methods. The first method is to execute test cases as stand-alone. That is one test case at a time. The second method is to use an automated test procedure. The second method allows the tester to run all test cases automatically. That is, there is no need for user interaction during test execution Test Case Implementation The implementation for a complete test case requires the following parts: implementation of Java card applet part; implementation of LabView part; implementation of the TTC part (test code is written in C, but could also be written in C++, Java or other software programming languages); write configuration data; and write reference file.

Implementation of Java Card Applet Part

A first aspect of the described embodiment of the present invention is to develop and store a Java card applet on a SIM card using a card reader/writer device. A Java card applet with some SAT functionality was created and tested on a mobile simulator and on a real mobile terminal. The next set requires installing Java files on a SIM card.

The next aspect of the described embodiment of the present invention required testing the Java card applet on a reference mobile terminal. A reference hardware design terminal may not contain a menu system. However the menus can be created in a mobile platform and accessed by using OPA. A menu selection envelope command is sent from TVA (Test and Verification Assistant) to select the menus and verify that the methods the menus contain were executed. TVA is a LabView program used to execute stimuli in Target Test Code.

All communications between TVA and the mobile terminal are logged on the PC screen, including the proactive command and the terminal response. The proactive command and terminal response were compared with reference values defined in the 3GPP specification.

As long as the Java card applet can handle input parameters, all proactive commands are sent from PC to the SIM card through the mobile terminal.

Implementation of LabView Part

LabView is a graphical development environment for creating flexible and scalable tests. The LabView results are gathered and displayed in the test case window as pass (green) or fail (red). To achieve a complete test environment, a test case for each proactive command is developed. The test cases were created from a LabView template used as a guideline for keeping the same structure, code rule and increase implementation. The template contains layers used to communicate with the mobile terminal through TVP and it also includes methods for test case development. The test cases are basically the same for all tests as they consist of a pre-run, execute and post run. Pre-run is a method used to initialize the mobile terminal, execute performs the test session and post run ends the test. The pre-run activates the communication part between the mobile terminal and the SIM card and activates the two menus in the SIM card. Execute sends the data to the SIM card and selects the two menus. The first menu as described in more detail below, collects the data parameters from the mobile terminal and menu two sends the proactive command to the mobile terminal. The outcome of the proactive command is gathered by LabView and compared with its reference value for validation. A green color is displayed in the front panel if the outcome of the proactive command matches the reference value. A red color is displayed in the front panel if the outcome fails. When the test is finished, the post run calls terminate SAT which disconnects the SAT communication.

There are 39 test cases that cover all proactive commands supported by the platform. Future proactive commands can be tested at the same way by creating new test cases.

Implementation of the TTC Part

To achieve a functional test case the TTC must be updated. TTC target test code is an application that executes stimuli generated by LabView. The main updates are implementations of functions that gather the proactive command and terminal response from SwBP. Since the communication between LabView and the mobile terminal runs through TTC, it is not possible for LabView to collect information about the proactive command and terminal response from SwBP without these functions being implemented.

Write Configuration Data

A configuration file supports the LabView script with test cases data needed for the generation of proactive command. That is configuration data contains all parameter needed by a test case.

Write Reference Data

Results data from test case execution are compared to reference file data. Data in the reference file are created to be compliant with 3GPPP SAT standard.

FIG. 8 sets forth the sequence of communication, such as Play Tone, among a PC, mobile terminal and SIM card. In step 801 a stimuli called "ReceiveDataSetResponse" is sent from LabView which resides on a PC to TTC containing the parameters of the proactive command to be created. In step 802, a "MenuSelectionDownloadNotification" stimuli is sent from LabView to TTC to select menu one. In step 803, TTC passes the parameters of the stimuli "MenuSelectionDownloadNotification" to OPA by calling a function called "ISimApplicationToolkit_MenuSelectionDownload." In step 804, OPA calls SwBP, which performs the menu selection by sending an envelope command to the SIM card in step 805. As seen in step 806, when the SIM card receives the envelope command, a hard coded proactive command called "ReceiveData" is sent from the SIM card to SwBP. In step 807, SwBP performs a control of the proactive command. If the command is correct SwBP passes the proactive command further to OPA and TTC in step 808, if not the SwBP returns a command called "Terminal Response" indicating that the proactive command was wrong. In step 809, the TTC has a method that adds the parameters in "ReceiveDataSetResponse" to terminal response. In step 810, the terminal response and the parameters of the desired proactive command (e.g. PlayTone) is sent to the SIM card and stored in a buffer. The SIM card builds the proactive command (e.g. PlayTone) and sends it to SwBP. SwBP performs a control of the proactive command. If the command is correct SwBP passes the proactive command further to OPA and TTC, if not the SwBP returns a command called "terminal Response" indicating that the proactive command was wrong. In step 811, LabView calls a stimuli called, for example, PlayToneSetResponse, which adds a parameter to the "Terminal Response" for PlayTone proactive command. In step 812, a probe is activated (SetProbeMode). In step 813, a "MenuSelectionDownloadNotification" stimuli is sent from LabView to TTC to select menu two. In step 814, TTC passes the parameters of the stimuli "MenuSelectionDownloadNotification" to OPA by calling a function called "ISimApplicationToolkit_MenuSelectionDownload. In step 815, OPA calls SwBP, which performs the menu selection by sending an envelope command to the SIM card in step 816.

There are a number of advantages of the method of the present invention over conventional testing methods. One advantage is that the test can be automated. Another advantage is that parameters can be passed from LabView to the SIM card easily. This increases the efficiency of the test and makes it more flexible. The method of testing of the present invention takes less time and is more reliable than a conventional test. There is no need for hard coded proactive commands, which mean that additional test cases can easily and quickly be added.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of testing a subscriber identity module application toolkit (SAT) in a mobile terminal, the SAT providing an interface between the mobile terminal and a subscriber identity module (SIM) card, the method comprising the steps of:
    loading a computer program comprising a software tool for designing test, measurement, and control systems into a computer in communication with the mobile terminal;
    sending a first stimulus command from the computer program to the mobile terminal, which sends a first envelope command in response through the SAT to the SIM card, wherein the first stimulus command includes parameters of a desired proactive command;
    in response to receiving the first envelope command by the SIM card, sending a hard-coded proactive command from the SIM card to the SAT;
    determining by the SAT, whether the hard-coded proactive command is correct;
    when the SAT determines the hard-coded proactive command is not correct, returning a response from the SAT to the SIM card indicating the hard-coded proactive command was not correct;
    when the SAT determines the hard-coded proactive command is correct, passing the hard-coded proactive command from the SAT to the mobile terminal;
    preparing by the mobile terminal, a first terminal response;
    forwarding from the SAT to the SIM card, the first terminal response and the parameters of the desired proactive command that were received from the computer program in the first stimulus command;
    building the desired proactive command by the SIM card utilizing the parameters received in the first terminal response;
    sending the desired proactive command from the SIM card to the SAT;
    determining by the SAT, whether the desired proactive command is correct;
    when the SAT determines the desired proactive command is not correct, notifying the SIM card that the desired proactive command was not correct;
    when the SAT determines the desired proactive command is correct, passing the desired proactive command from the SAT to the mobile terminal;
    sending a second terminal response through the SAT to the SIM card in response to the passing of the desired proactive command; and
    capturing the second terminal response by the computer program for analysis.

2. The method of claim 1, wherein the hard-coded proactive command is a command for receiving data.

3. The method of claim 1, further comprising the steps of:
    using a method in a SIM card menu to build new proactive commands; and
    sending by the SIM card the new proactive commands when proactive command data are passed to the SIM card.

4. The method of claim 3, further comprising the step of sending the proactive command data from the computer program first to target test code (TTC) in the mobile terminal.

5. The method of claim 4, further comprising the step of using the TTC to execute at least one open platform API (OPA) function.

6. The method of claim 5, wherein the TTC is written in the C programming language.

7. The method of claim 1, wherein the SIM card includes computer program instructions written in the JAVA programming language.

8. The method of claim 1, wherein the computer program is written in the testing program LabView.

9. An arrangement for testing a subscriber identity module application toolkit (SAT) in a mobile terminal, the SAT being resident on a software backplane (SwBP) of the mobile terminal and providing an interface between the mobile terminal and a subscriber identity module (SIM) card, the arrangement comprising:
    a computer in communication with the mobile terminal, the computer having loaded thereon, a computer program comprising a software tool for designing test, measurement, and control systems, wherein the computer program is configured to send a first stimulus command from the computer to the mobile terminal, wherein the first stimulus command includes parameters of a desired proactive command;
    wherein the mobile terminal is configured to send a first envelope command in response to the first stimulus command through the SAT to the SIM card;
    wherein the SIM card is configured to send a hard-coded proactive command to the SAT in response to receiving the first envelope command;
    wherein the SAT is configured to determine whether the hard-coded proactive command is correct, wherein:
        when the SAT determines the hard-coded proactive command is not correct, the SAT returns a response to the SIM card indicating the hard-coded proactive command was not correct; and
        when the SAT determines the hard-coded proactive command is correct, the SAT passes the hard-coded proactive command to the mobile terminal;
    wherein the mobile terminal is configured to prepare a first terminal response in response to receiving the hard-coded proactive command;
    wherein the SAT is configured to forward to the SIM card, the first terminal response and the parameters of the desired proactive command that were received from the computer program in the first stimulus command;
    wherein the SIM card is configured to build the desired proactive command utilizing the parameters received in the first terminal response, and to send the desired proactive command from the SIM card to the SAT;
    wherein the SAT is configured to determine whether the desired proactive command is correct, wherein:
        when the SAT determines the desired proactive command is not correct, the SAT notifies the SIM card that the desired proactive command was not correct; and
        when the SAT determines the desired proactive command is correct, the SAT passes the desired proactive command from the SAT to the mobile terminal;

wherein the mobile terminal is configured to send a second terminal response through the SAT to the SIM card in response to the passing of the desired proactive command; and wherein the computer program is configured to capture the second terminal response for analysis.

10. The arrangement of claim 9, wherein the computer program is configured to automatically compare the terminal response with reference files.

11. The arrangement of claim 10, wherein the reference files are defined by the Third Generation Partnership Project (3GPP).

12. The arrangement of claim 9, wherein the hard-coded proactive command is a command for receiving data.

13. The arrangement of claim 9, wherein the SIM card is configured to utilize a method in a SIM card menu to build new proactive commands, and to send the new proactive commands when proactive command data are passed to the SIM card.

14. The arrangement of claim 13, wherein the computer program is configured to send the data for the proactive command data first to target test code (TTC) in the mobile terminal.

15. The arrangement of claim 14, wherein the TTC is configured to execute at least one open platform API (OPA) function.

16. The arrangement of claim 15, wherein the TTC is written in the C programming language.

17. The arrangement of claim 9, wherein the SIM card includes computer program instructions programmed in the JAVA programming language.

18. The arrangement of claim 9, wherein the computer program is written in the testing program LabView.

* * * * *